United States Patent [19]
Lokema

[11] 3,881,302
[45] May 6, 1975

[54] PICKING MACHINE
[75] Inventor: Lolke Lokema, Delfzijl, Netherlands
[73] Assignee: Ter Borg & Mensinga's Machinefabriek N.V., Appingedam, Netherlands
[22] Filed: June 14, 1974
[21] Appl. No.: 479,290

[52] U.S. Cl................................ 56/130; 56/364
[51] Int. Cl............................................ A01d 45/22
[58] Field of Search ........................... 56/126–130, 56/116, 119, 13.5, 330, 364; 171/63

[56] References Cited
UNITED STATES PATENTS
2,696,706   12/1954   Getsinger.......................... 56/130 X Primary Examiner—Hugh R. Chamblee
Assistant Examiner—J. N. Eskovitz
Attorney, Agent, or Firm—Kaufman & Kramer

[57] ABSTRACT

Machine for picking low growing crops, such as beans. The machine is of the lateral or multi-row type having a rotary picking drum the axis of which extends transverse to the rows of plants. The picking plate is provided with downward curved extensions, between the rows of plants, for the purpose of catching fruits and foliage while the plants are being threshed in the direction from foot to tip.

6 Claims, 2 Drawing Figures

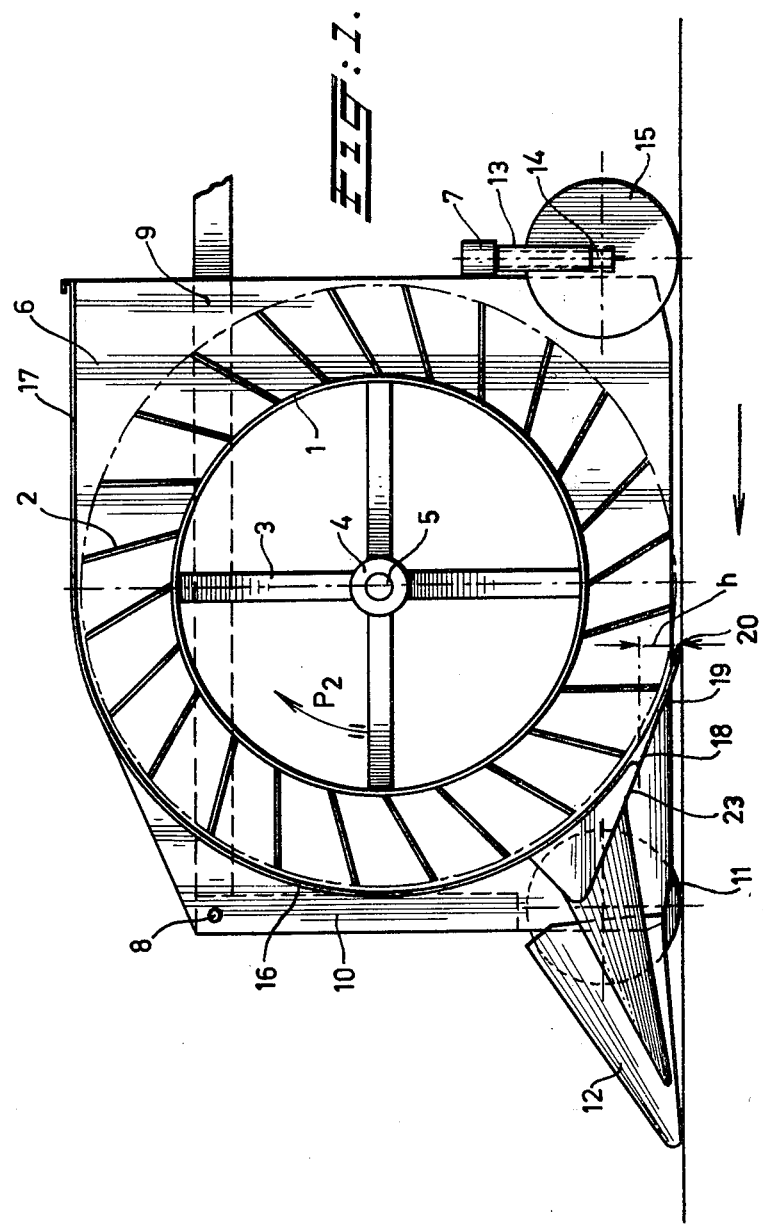

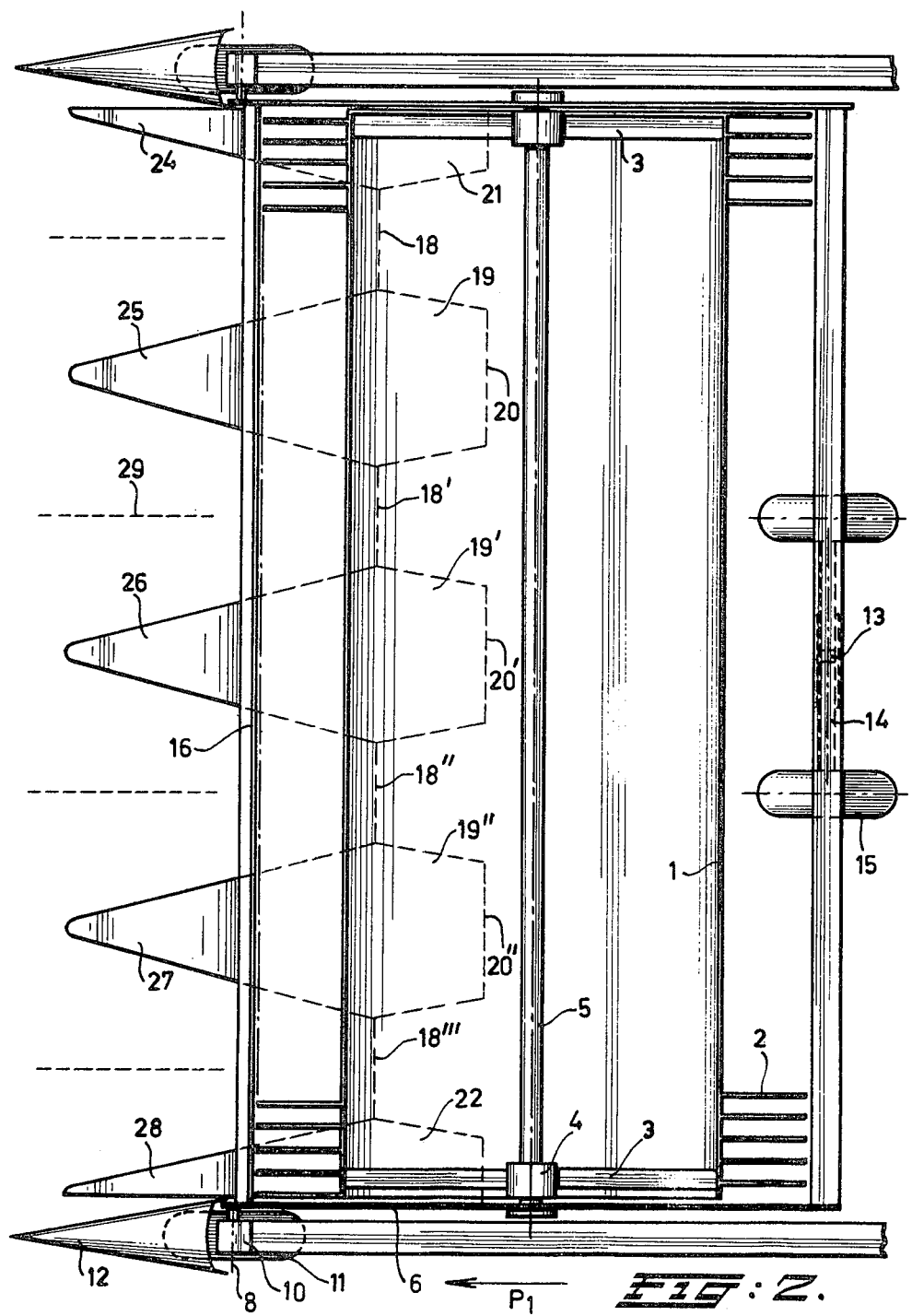

PICKING MACHINE

BACKGROUND OF THE INVENTION

The invention relates to a machine for harvesting low growing crops, such as beans, said machine comprising a drum provided with a plurality of picking fingers, said drum having an axis transverse to the direction of travel, and being rotatable in a sense opposite the sense of rotation of the machine wheels, said drum co-operating with the lower edge, substantially at picking height, of a picking plate extending in curved shape at least at the front side partially around the drum.

Multi-row picking or harvesting machines are known in the art already. The type is different from the picking machines acting upon one or two rows by means of one or two picking drums having an axis parallel to the direction of the travel of the machine, each drum picking no more than one row of the crop. The latter type is disadvantageous in that the operator has to do very precise steering because the rows of the crop should be followed; otherwise part of it will get lost. The lateral or multi-row picking machine as type will cope with this problem.

Various multi-row picking machines are provided at the front with a supply device in form of an endless belt, provided with projecting members, and having a width substantially equal to the width of the picking drum. The operative face of the belt is arranged under an angle between 30° and 45° and its direction of movement is opposite to the direction of travel of the machine. By means of this supply device the plants are bent and fed to the edge of the picking plate which cooperates with the picking drum, in order that the picking be done, starting with the tips of the plants.

The provision of such a supply device is a complication in general already. Moreover the user will have to adjust the correct angle of operation, in dependence on the various qualities of the crop to be harvested, in order to insure the correct operation.

The invention aims at the provision of a simplified multi-row picking machine.

It has for object a multi-row picking or harvesting machine of the above mentioned type in which the supply device in form of a belt can be entirely dispensed with.

Another object is to provide a multi-row picking machine having a picking plate of such configuration that the plants can be picked starting near the foot of the stem and then onward to the tip.

SUMMARY OF THE INVENTION

In the machine according to the invention the picking plate is provided at alternate locations with extensions, curved cylindrically around the picking drum contiguous with the cylindrically curved picking plate body, these extended plate portions having edges substantially at the same level as the lowermost point of the picking fingers, the distance between the centres of the extensions being chosen so as to correspond with the row spacing of the crop to be harvested. It has thus turned out to be possible to dispense with the whole supply device and to do the picking in the reverse sense by first having the plants come below the picking plate and then simply thresh and dislodge the beans from the stems. The extended plate portions, which nearly reach the ground, will then find themselves between the rows of plants. Between these extended plate portions the picking plate will end at the usual picking level or picking height, and as far as the foliage together with the fruits will not have been conveyed by the picking fingers along the inside of the curved picking plate upwardly, the extended picking plate portions at either side of the picking edge will assure that all of the picked material will be within reach of picking fingers, so that in the end all of it will be conveyed upwardly and no beans will fall down and be left behind.

Preferably, according to the invention, torpedo shaped guide bodies, projecting in forward direction, will join the extended picking plate portions, these bodies funcitoning so as to erect and guide the crop toward the picking edges between the picking plate extensions. In this way it is ensured that all of the crop will be picked, no matter whether certain plants have grown with a great lateral width, or whether some of the plants will have fallen over under the influence of rain or wind.

In practice the farmers will apply various sorts row spacings. The spacing chosen will depend on the sort of crop but also on the sort of soil. As is known in sowing machines the sowing units can be adjusted with various spacing. With regard to this the present invention also provides for the detachability and exchangeability of the picking plate as a whole. The user of the machine will be able to mount a picking plate corresponding with the row spacing in the crop to be harvested.

In the alternative the invention provides for picking plate extensions realised as seperate parts, to be attached to the fixed picking plate with mutual distance to be chosen as desired.

Also it is useful when the cylindrically curved picking plate and the extended plate portions are provided exteriorly with stiffening means, for example made out of bent plate material. At the location of the picking edge one may provide for a rounded transition between the picking plate and the stiffening plate.

SURVEY OF THE DRAWINGS

The invention will hereinafter be clarified with reference to the accompanying drawing which represents one embodiment of the machine of this invention. In the drawing:

FIG. 1 is a vertical sectional view through the machine, this view being taken perpendicular to the axis of the picking drum;

FIG. 2 is a horizontal sectional view through the axis of the picking drum.

DETAILED DESCRIPTION OF THE PREFERRED EMBODIMENT

As is visible in the drawing the picking drum 1, which is in known manner provided with a great number of picking fingers 2 regularly spaced over the circumference and over the entire length of the drum, is supported at either end by a cross of spokes 3, having hubs 4 mounted on the horizontal shaft 5. The picking drum has a rotary drive which can be realised entirely in known way and which is therefore not shown.

The drum axis is transverse with respect to the direction of travel indicated in FIGS. 1 and 2 by the arrows P1; the direction of travel P1 coincides with the longitudinal direction of the rows of the crop in the field. The direction of the rotation of the drum is indicated in FIG. 1 by the arrow P2.

The rotating drum is supported in a drum frame which includes a pair of side plates 6 and a rear beam 7. This drum frame 6, 7 is tiltable as a whole around the horizontal axis 8 in the machine frames 9, 10. The tilting or pivoting axis 8 may be constituted by pins and suitable bearings. The front vertical posts 10 of the machine frame are provided at the lower ends with wheels 11, which are vertically adjustable in known manner. In front of each wheel 11 a curved cover 12 is affixed to the vertical post 10. The rear and horizontal beam 7 of the drum frame 6, 7 supports a swiveling axis 13, which in turn supports a short axle 14 which is provided at its ends with rear wheels 15. Also the rear wheels 15 are vertically adjustable; when adjusting the height the drum with the drum frame will pivot about the pivoting axis 8 with respect to the machine frame.

Between the side plates of the drum frame the picking plate is affixed. The picking plate comprises a cylindrically curved portion 16 at the front of the drum 1, 2, having a somewhat larger radius than the radius of the extremities of the picking fingers 2 with respect to the axis of the shaft 5. At the top of the curved plate portion 16 merges into a horizontal plate portion 17 which, further to the rear, merges into the well known device for further treatment of the material picked, which is therefore not represented.

As is visible in FIG. 2 the curved picking plate 16 has lower edges 18, 18', 18'', 18''', having equal distances between their centers. These straight edges act as picking edges and their height above the ground is indicated in FIG. 1 by $h$. Intermediate these four edges the picking plate 16 has extended portions indicated by 19, 19', 19''. These extended portions in the embodiment shown are trapezium shaped, ending in horizontal edges 20, 20', 20''. At either end of the picking plate extensions 21 and 22, respectively, are provided, the shape of which corresponds with half the trapezium shape of the intermediate and complete extensions such as 19. It is visible in FIG. 1 that the extreme edges 20, 20', 20'' of the picking plate extensions have the same height above the ground as the lower extreme ends of the picking fingers, which is in practice just above the ground when the vertical position of the various wheels has been properly adjusted. The picking fingers should, as a rule, not touch the ground, but they should start the picking of the stems as low as possible.

Against the lower face of the picking plate 16 a stiffening 23 is provided, which may be manufactured in the same plate material as the picking plate itself. The configuration and shape of the stiffening 23 matches with the course of the lines 18, 20, 18', etc. of the picking plate itself. At the location of the extreme lower edges 20, 20', 20'' the picking plate and the stiffening plate may simply be welded one immediately against the other; at the location of the picking edges 18 — 18'' incl. a rounded transition being made which is visible in FIG. 1. It is at this location that, by cooperation of these edges with the picking fingers 2 which during rotation of the drum move upwardly, the picking proper will take place.

Also in this embodiment a plurality of torpedo shaped guide bodies 24, 25, 26, 27, 28 is provided and lower side of the picking plate. As is visible in the drawing these bodies have forwardly directed points, i.e., pointing in the direction of travel of the machine, their height and width increasing further to the rear. These torpedo shaped bodies may be manufactured in plate material which is simply bent into the desired shape, for example the same plate material which is also used for manufacturing the picking plate and the stiffening means thereof. The guide bodies at their rear ends match precisely with the extended portions 19, 19', 19'', 21, 22 of the picking plate where they project downwardly and rearwardly past the picking edges 18, 18', 18'', 18'''. The steering of the machine is done such that the guiding bodies 24 - 28 incl. are situated substantially amidst between the rows of plants; these rows of plants are diagramatically indicated in FIG. 2 by broken lines such as 29. Each row of plants is therefore narrowed and put upright in the tunnel shaped space which is formed between each pair of adjacent guiding bodies so that subsequently at the location of the picking edges 18 — 18''' incl. the picking can take place.

By the configuration of the curved picking plate 16, provided with the flat stiffening plate 23, the plants will be bent forwardly because of the traveling movement of the machine; so in FIG. 1 the bending of the plants will take place to their left. As soon as the picking edge 18 comes to lie over each plant it will be picked, i.e., the foliage together with the fruits will be threshed, starting near the foot of the stem and thus gradually upwardly as the picking machine moves on.

The radial distance between the picking plate 16 and the operative extreme ends of the picking fingers 12 is limited to a small value of for example not more than 1 cm. All of the picked material which, after removal from the stem, would get beside the area of the picking edge 18, 18', 18'' or 18''', respectively, will be caught there on the extended picking plate portions 19, 19', 19'', 21 and 22. When lying on the surface of these plate portions all of this picked material is at any moment within reach of groups of picking fingers 2, which are present over the full drum length, so that in the end all of it will be taken up along the convex side of the picking plate 16, 17 and no fruits will get out of the machine and be left behind on the land.

It will also have become apparent that the two rear wheels are so arranged that they run substantially over a pair of rows of plants after the picking thereof; rows of plants are indicated by broken lines such as 29. With regard to the fact that the soil at the location of the rows of plants due to the usual earthing up will be higher than the soil between the rows of plants. One obtains in this way the best possibility for the correct adjustment of the height of the center of the picking drum. Thus in the co-operation between the two front wheels 11 and the two rear wheels 15 one obtains a minimum different picking depth when the ground is uneven.

In the embodiment shown the picking plate 16 is depicted as a whole. It is possible to make the picking plate together with the upper portion 17 and including the stiffenings 23 and the torpedoes 24 - 28 incl. detachable and exchangeable in the drum frame. In this way the user is enabled to choose for the situation on his land, especially the mutual, distance between the rows, one complete picking plate with the correct mutual distance between the picking edges 18 — 18''' incl. and to mount this plate into the machine. Alternatively, however, the picking plate 17, 16 down to the picking edges 18 — 18''' incl. is made permanently affixed to the machine, the picking plate extensions 19, 19', 19'', 21, 22 then being made as seperate parts, thereto provisions being made which allow for the attachment of these separate extensions to the fixed part of the picking plate 16 with mutual distances to be chosen as desired. In that case as a matter of course the torpedo shaped guide bodies 24 – 28 incl. would belong to the exchangeable parts.

What we claim is:

1. Machine for harvesting low growing crops, such as beans, said machine comprising a drum provided with a plurality of picking fingers, said drum having an axis transverse to the direction of travel, and being rotatable in a sense opposite the sense of rotation of the machine wheels, said drum cooperating with the lower edge, substantially at picking height, of a picking plate extending in curved shape at least at the front side partially around the drum, wherein the picking plate is provided at alternate locations with extensions, curved cylindrically around the picking drum contiguous with the cylindrically curved main picking plate body, these extended plate portions having edges substantially at the same level as the lowermost of the picking fingers, the distance between the centers of the extensions being chosen so as to correspond with the row spacing of the crop to be harvested.

2. Machine as in claim 1, wherein torpedo shaped guide bodies, projecting in forward direction, will join the extended picking plate portions, these bodies functioning so as to erect and guide the crop toward the picking edges between the picking plate extensions.

3. Machine as in claim 1, wherein the cylindrically curved picking plate and the extended plate portions are provided exteriorly with stiffening means in bent plate material, at the location of the picking edge a rounded transition being made.

4. Machine as in claim 1, wherein the picking plate and the picking plate extensions integral therewith, is detachable and changeable with respect to the machine.

5. Machine as in claim 1, wherein the extended plate portions are realized as seperate parts which are detachable with respect to the fixed main plate.

6. Machine as in claim 1, wherein the extended plate portions provided with torpedo shaped bodies are realized as seperate parts which are detachable with respect to the fixed main plate.

* * * * *